United States Patent [19]

Smukal

[11] Patent Number: 5,029,380
[45] Date of Patent: Jul. 9, 1991

[54] METHOD OF MAKING A COMPOSITE CORE TRANSDUCER

[75] Inventor: Gary T. Smukal, Redwood City, Calif.

[73] Assignee: Ampex Corporation, Redwood City, Calif.

[21] Appl. No.: 627,293

[22] Filed: Dec. 13, 1990

Related U.S. Application Data

[62] Division of Ser. No. 374,419, Jun. 30, 1989, Pat. No. 5,001,588.

[51] Int. Cl.$^5$ ............................................. G11B 5/42
[52] U.S. Cl. ............................ 29/603; 360/120; 360/126
[58] Field of Search ............... 29/603; 360/119, 120, 360/122, 125, 126

[56] References Cited

U.S. PATENT DOCUMENTS 4,704,788 11/1987 Eckstein .......................... 29/603
4,839,959 6/1989 Mersing .......................... 360/122 X Primary Examiner—Carl E. Hall
Attorney, Agent, or Firm—Elizabeth E. Strnad

[57] ABSTRACT

A magnetic transducer and manufacturing method, where a transducer core is made from a composite block of magnetic material. The composite block has a first portion made of a first magnetic material, and a second portion made of a second magnetic material, the two block portions being integrally joined at corresponding planar surfaces. In the preferred embodiment, the first magnetic material is selected to have high granular density and other physical and magnetic properties which are necessary to obtain excellent transducing gap definition. The second magnetic material is selected to obtain high transducer performance. The composite block is machined around a periphery thereof at surfaces extending at oblique angles to said joined surfaces to provide a magnetic core having its first portion reduced to a wedge shaped portion. The wedge shaped portion has a first thusly obtained surface extending in a transducer-to-medium interface, a second surface extending in a transducing gap plane, and a third surface, corresponding to the integrally joined surfaces. The oblique angle between the second and third surface is selected along with other design parameters to obtain a desired small length of the wedge shaped portion in the transducer-to-medium contact area, while the total amount of the first magnetic material in the transducer is significantly reduced.

10 Claims, 4 Drawing Sheets

METHOD OF MAKING A COMPOSITE CORE TRANSDUCER

This is a divisional of copending application Ser. No. 07/374,419 filed on 6/30/89 now U.S. Pat. No. 5,001,588.

The invention relates to a composite core magnetic transducer with improved transducing gap definition and performance, and to a method of making such transducer. The invention is particularly useful in applications where the transducer is in direct contact with the recording medium, and where high frequency signals are recorded/reproduced at a high relative transducer-to-medium speed.

BACKGROUND OF THE INVENTION

Magnetic transducers in contact with the recording medium exhibit wear in the transducer-to-medium interface area due to abrasion effected by the medium. Such wear shortens the useful life of the transducer, which has to be often replaced at considerable cost. Among the desirable features of magnetic transducers, in addition to wear resistance, is to have a well defined transducing gap which maintains its shape during the useful life of the transducer. To extend transducer life, while also improving transducing gap definition and integrity, various magnetic as well as nonmagnetic materials have been utilized in the transducer-to-medium interface area, in combination with magnetic core materials having desirable magnetic propertes. However, such known composite core structures are rather complex, and they employ complicated, and therefore costly manufacturing methods.

Magnetic materials which provide excellent gap definition and integrity generally have high granular density, and therefore are not susceptible to "pullouts" of small grains of material during the manufacturing process or operation. Such pullouts lead to chipping or breaking of the magnetic material, thereby damaging the sharp edges defining the transducing gap, and degrading the gap. Pullouts may occur during certain manufacturing steps, for example lapping, or during operation, when the transducer is in contact with the medium at high relative transducer-to-medium speed.

An example of a type of magnetic materials having high granular density and which are known to provide very good gap definition, while also having desirable wear resistance propertes, are single crystal ferrites. However, as it is well known, single crystal ferrite when utilized in magnetic transducers in contact with the medium exhibits a disturbing rubbing noise, which distorts the information signal. Rubbing noise is attributed to magnetostriction which, as well known is a property of a magnetic crystal material to change the magnetic reluctance in response to an external force. In this case the external force is represented by the magnetic medium in contact with the magnetic crystal material of the transducer. It is further known that when utilizing single crystal ferrite, the magnetic as well as other properties, such as rubbing noise, wear rate or material strength, each may be optimized by selecting a particular crystal axis orientation. However, when the crystal axis is oriented to optimize one parameter, for example to minimize rubbing noise, the other parameters will not be at their optimum values, and the overall transducer performance will suffer.

There are other magnetic materials with high granular density which provides a desirable gap definition, but they have other, less desirable properties when utilized in a large quantity in the magnetic transducer structure. Examples are metallic magnetic materials, such as Sendust or amorphous magnetic materials. These materials are known to provide excellent transducing gap definition and integrity, but they also have undesirable high frequency losses. Therefore, it is desirable to use only a minimum amount of these high density materials, in combination with other suitable magnetic materials, to reduce frequency losses.

SUMMARY OF THE INVENTION

The invention provides an optimum magnetic transducer structure, as follows. The transducer has two corresponding composite magnetic cores, which are assembled with a transducing gap forming material between them. Each composite core has a wedge shaped first magnetic core portion defining a transducing gap. The first core portion is made of a first magnetic material which, in the preferred embodiment has a desirable high granular density, and other physical and magnetic properties which are necessary to obtain excellent transducing gap definition and high performance. A second core portion which is made of a second magnetic material is integrally joined with the wedge shaped core portion at corresponding planar surfaces. The wedge shaped core portion has a first, relatively short surface extending in the transducer-to-recording medium contact area, a second surface defining a transducing gap, and a third surface, which corresponds to the integrally joined surfaces and extends at respective oblique angles to the first and second surface. The angle is selected along with other transducer dimensions to obtain a desired relatively small portion of the wedge in the transducer-to-medium contact area, while the total amount of the first magnetic material in the transducer is significantly reduced.

In accordance with the method of the invention, a composite block is made by integrally joining respective blocks of a first and a second magnetic material at corresponding planar surfaces. In the preferred embodiment the first magnetic material has a desirable high granular density, and other physical and magnetic properties which are necessary to obtain excellent transducing gap definition and high transducing performance, while the second material has a lower granular density. Portions of the composite block around the periphery thereof are removed at surfaces extending at oblique angles to the integrally joined surfaces to obtain a composite magnetic core where the first block portion is reduced to a wedge shaped portion. A first surface of the wedge shaped portion extends in a transducer-to-medium interface, a second surface extends in a transducing gap plane, and a third surface corresponds to the integrally joined surfaces. The oblique angle between the second and third surface is selected along with other dimensions, to obtain a desired minimum length of the wedge shaped core portion in the transducer-to-medium contact area, while the total amount of the first magnetic material in the transducer is significantly reduced.

DETAILED DESCRIPTION

Figure 1:
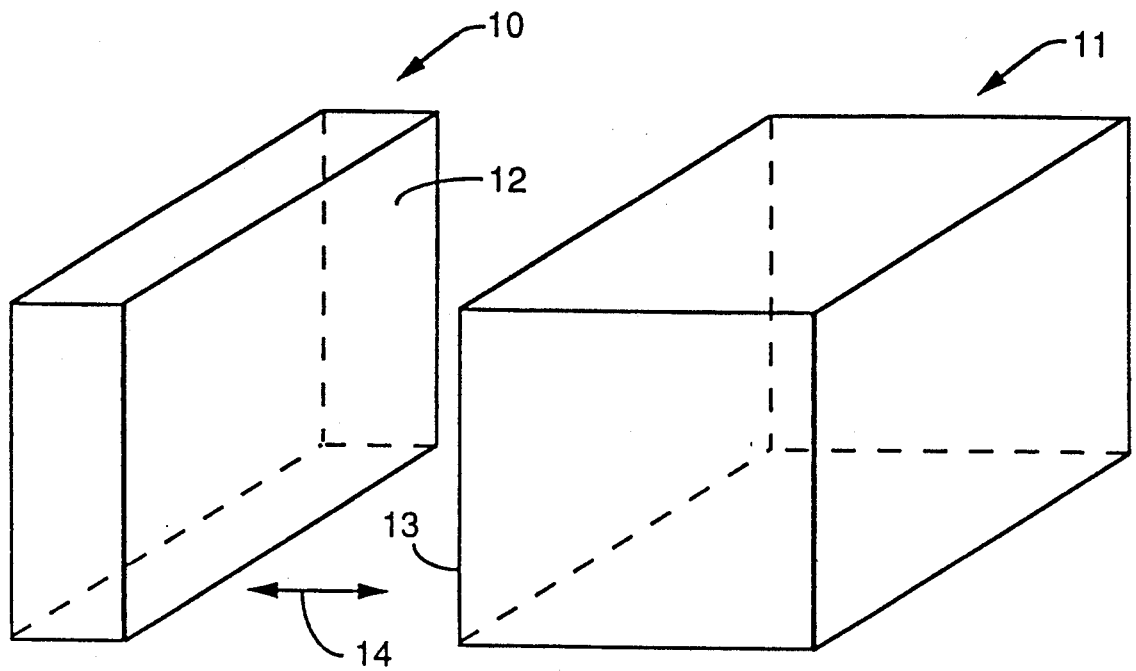
FIGS. 1 to 7 are simplified perspective views showing consecutive method steps of the preferred method of manufacturing a composite magnetic transducer of the invention.

The preferred method of constructing a magnetic transducer in accordance with the invention is described below with reference to FIGS. 1 to 8. FIG. 1 shows two rectangular blocks 10,11 made of different magnetic materials, having corresponding surfaces 12,13. In the preferred embodiment block 10 is made of a single crystal ferrite and block 11 of a polycrystalline ferrite. Corresponding surfaces 12,13 of each block are lapped flat and polished in a well known manner to obtain desired smooth surfaces. Thereafter the blocks 10,11 are assembled with their corresponding surfaces 12,13 in confronting relationship, as it is depicted by arrow 14, and these surfaces are diffusion bonded together at an elevated temperature and under pressure, utilizing well known diffusion bonding techniques. Alternatively, instead of providing two separate blocks 10,11 and joining them integrally by a bond, the single crystal ferrite portion 10 may be grown on the pollycrystalline ferrite portion 11, utilizing well known techniques.

Figure 2:
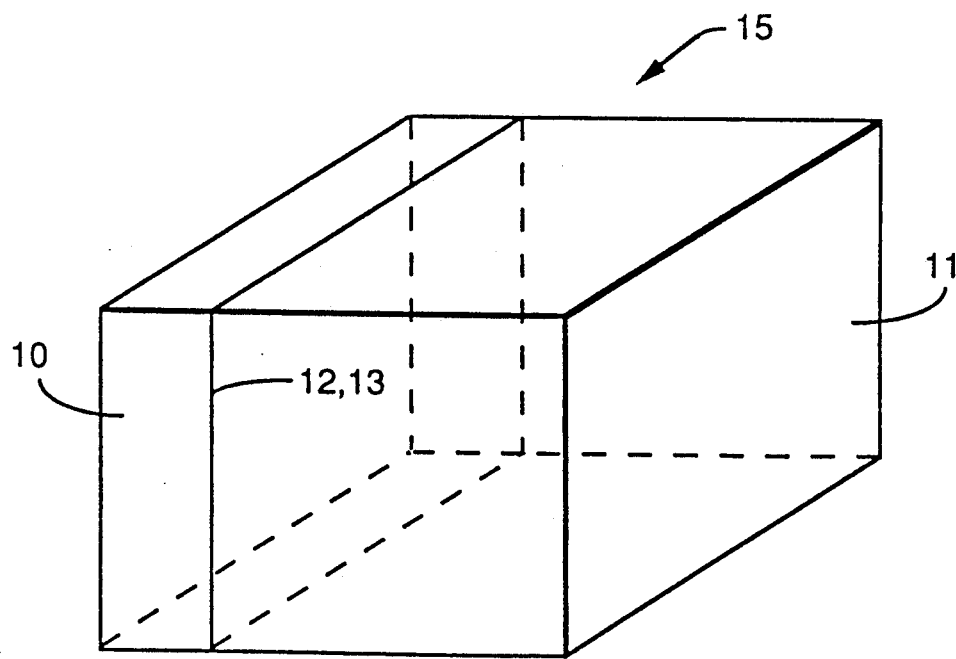
Figure 3:
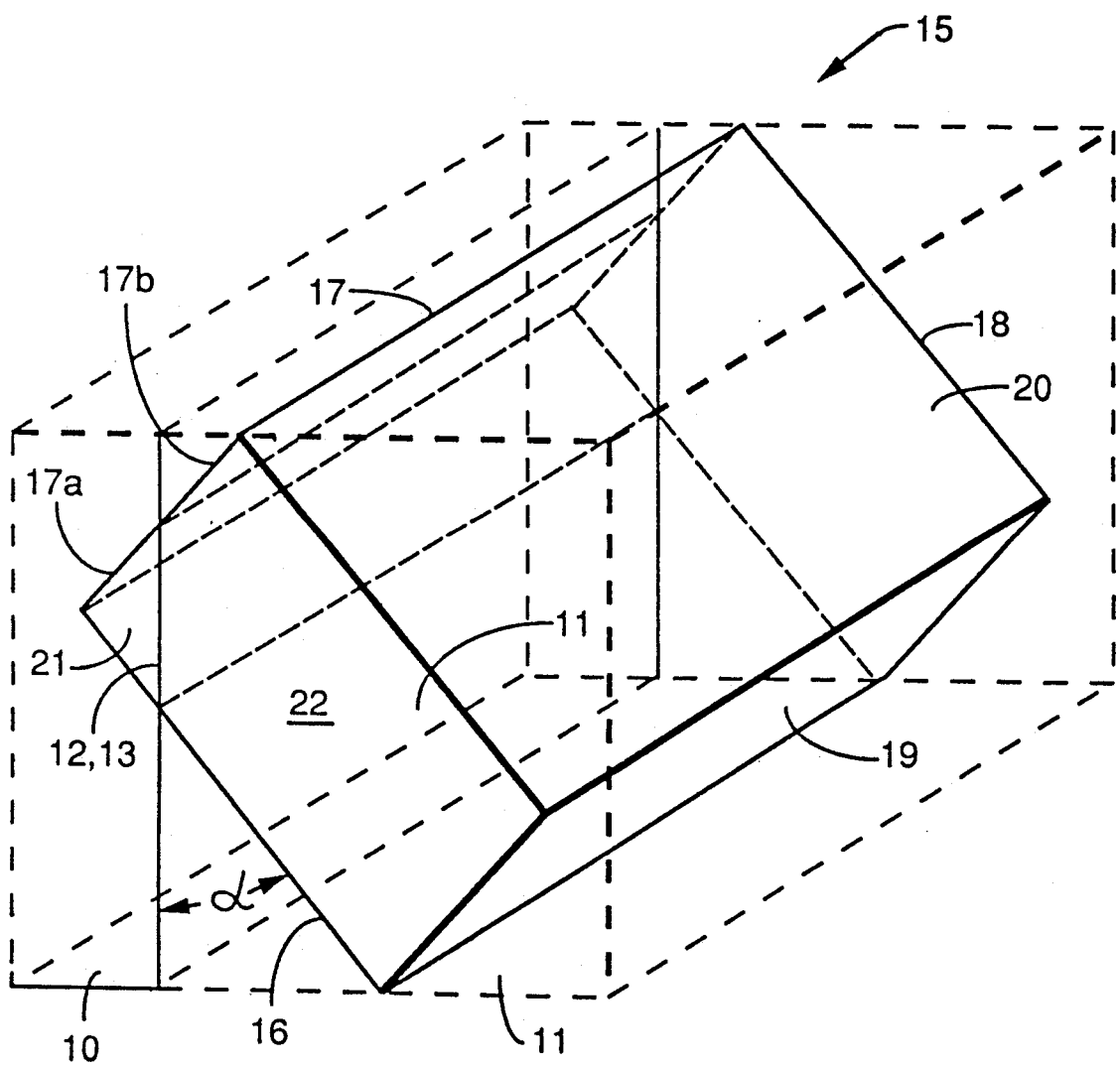

The resulting composite block 15 having integrally joined surfaces 12,13, is shown in FIG. 2. In accordance with the next method step depicted in FIG. 3, the composite block 15 is machined, for example ground or cut around the periphery thereof to obtain a composite magnetic core block 20, having peripheral surfaces 16 to 19 extending at oblique angles to the joined surfaces 12,13, as it will be described below. Thus parallel surfaces 16,18 are ground with reference to the joined surfaces 12,13 at an oblique angle alpha, preferably of 45 degrees or less. Parallel surfaces 17,19, are ground to extend substantially perpendicularly to surfaces 16,18. By the foregoing method step a rectangular composite magnetic core block 20 is obtained, which has a wedge shaped first portion 21 made of single crystal ferrite, and a second portion 22 made of polycrystalline ferrite. It is seen that the wedge shaped core portion 21 is obtained by removing portions of the block 10, and the core portion 22 results from removing portions of the block 11. The integrally joined surfaces 12,13 extend at an oblique angle alpha to surface 16. Surface 16 of the composite magnetic core block 20 corresponds to a transducing gap plane, as it will follow from the description below.

Figures 4, 5:
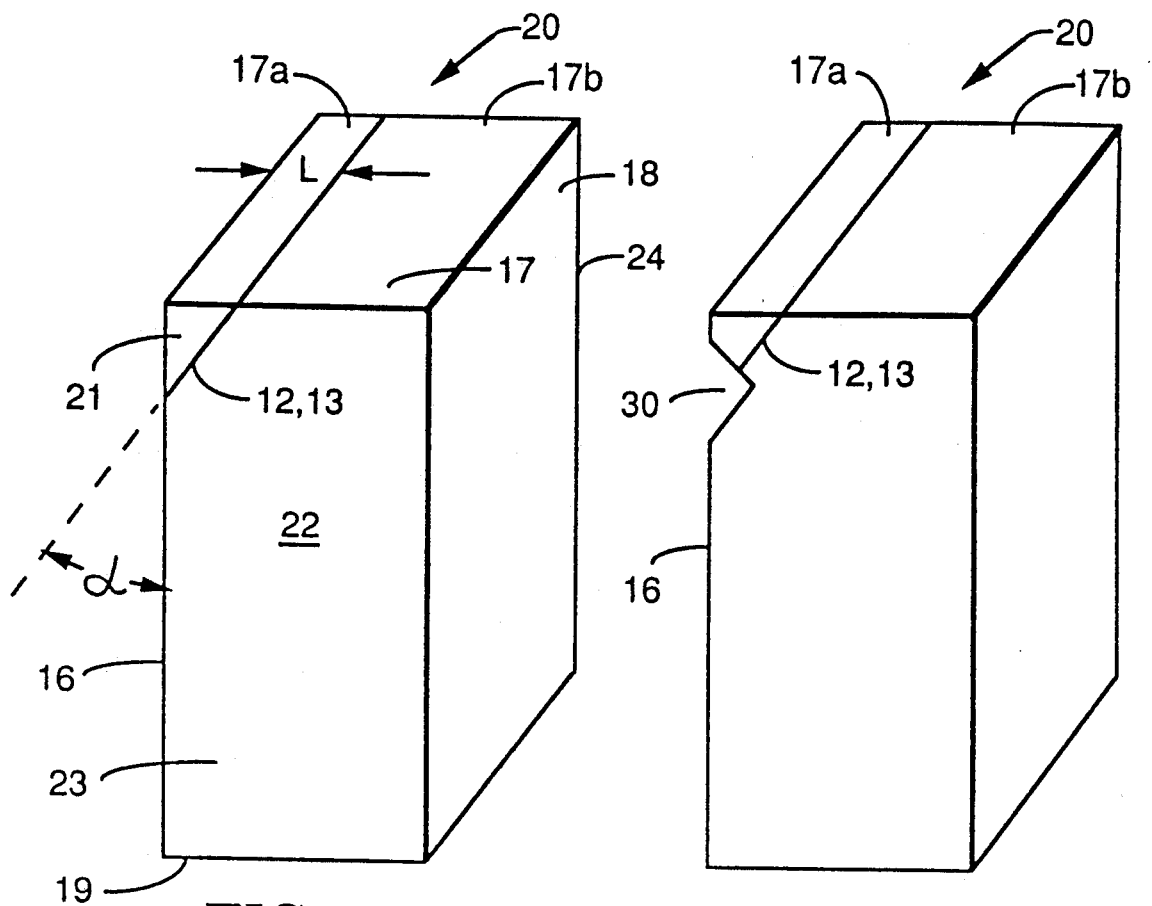

With further reference to FIG. 4, the resulting composite magnetic core block 20 has two opposite parallel planar surfaces 23,24 which extend substantially perpendicularly to the above-described peripheral surfaces 16 to 19. Surface 17 of block 20 corresponds to a transducer-to-medium interface or contact area. It is seen that the resulting block 20 is composed mostly of polycrystalline ferrite material, while only a relatively small portion in the shape of the wedge 21 is made of a single crystal ferrite. It is a particular advantage of the method of the invention that the medium contacting surface 17a of the wedge shaped portion 21 may be made to have a relatively short length L. As it will follow from further description, the transducing gap is defined by the surface of the wedge shaped portion 21, extending in the transducing gap plane 16. Because the single crystal ferrite material is present only in the critical areas defining the transducing gap, and its contact area with the medium is minimal, the rubbing noise is significantly reduced, while the gap integrity is maintained. As it is well known, the polycrystalline material, utilized in the other transducer-to-medium contact areas 17b, adjacent to area 17a but apart from the transducing gap, does not provide an objectionable rubbing noise in contact with the medium. At the same time, any material pullouts which may occur in the area 17b due to relatively lower granular density of this material will not influence the transducing gap definition. It follows from the foregoing description that the transducing gap integrity along with the magnetic recording/playback performance of the transducer in accordance of the invention are significantly improved.

FIG. 5 shows a further method step, where a groove 30 corresponding to a transducing winding window is machined, preferably ground in the composite magnetic core block 20 in a manner well known in the art. Preferably the window has a rectangular V-shape, but its shape or angle are not critical.

Figure 6:
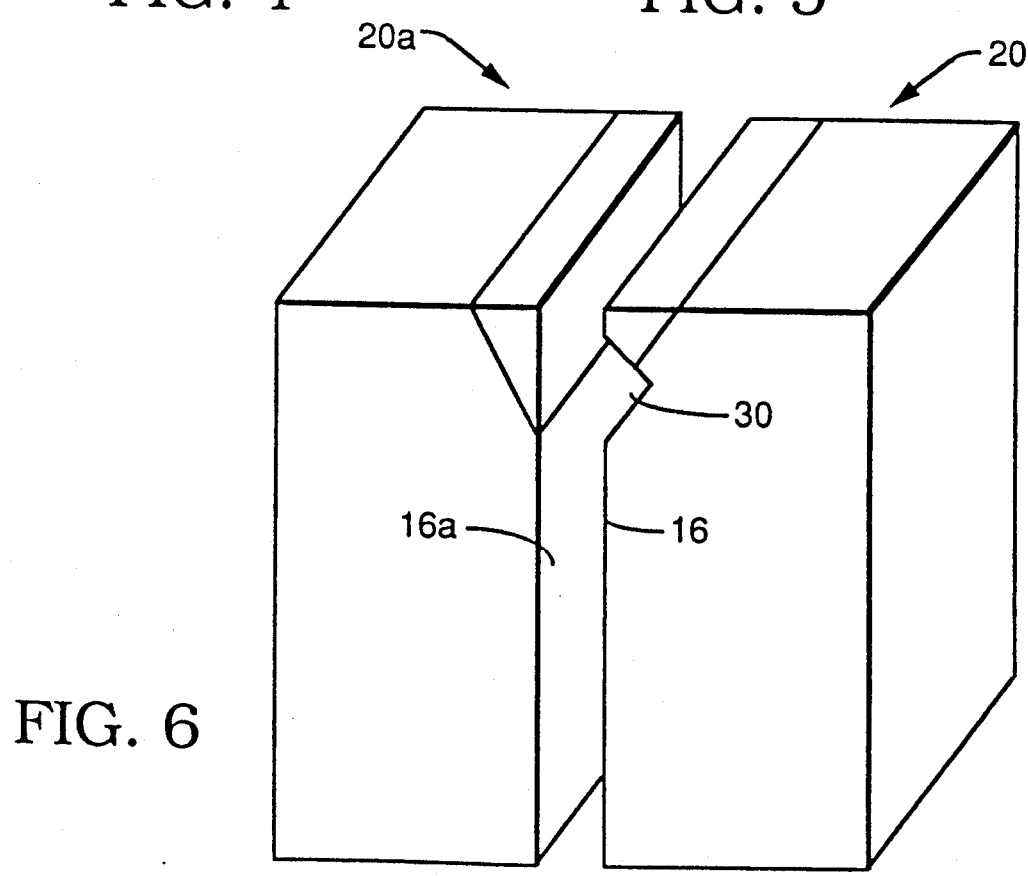
Figure 7:
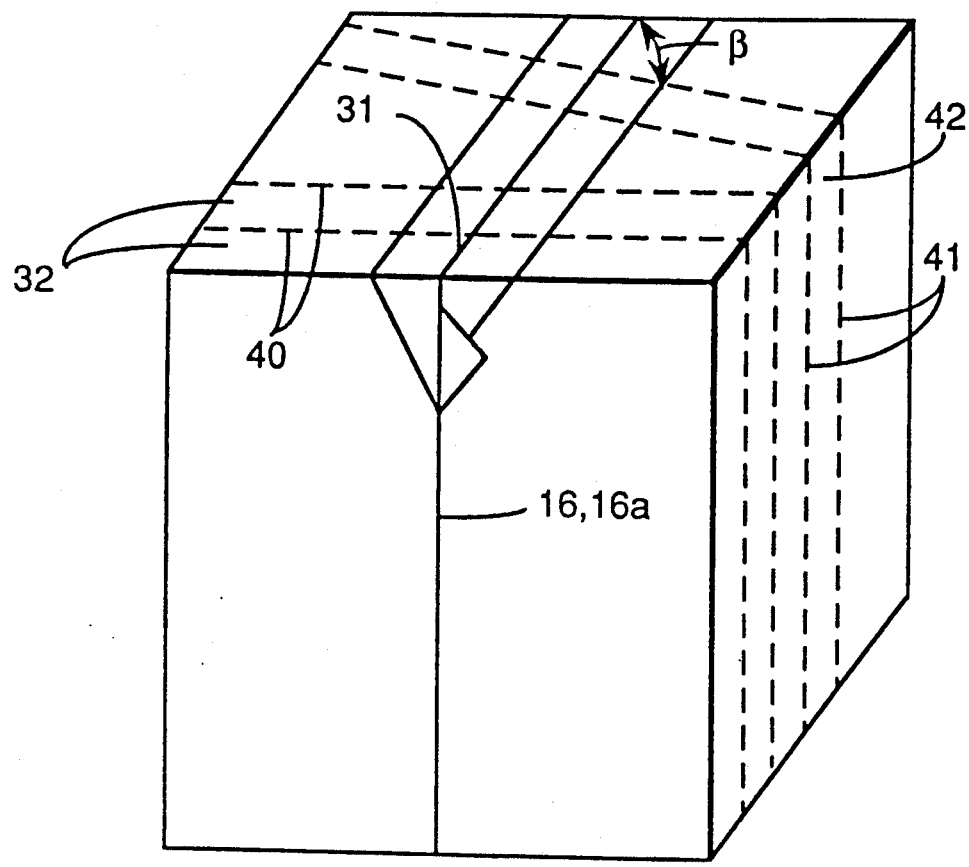

With reference to FIG. 6 a second composite magnetic core block 20a, corresponding to block 20 is prepared in a similar manner as it has been above described with reference to block 20. Block 20a may be without a winding window, as shown, depending on the amount of windings which have to be placed on the cores. The corresponding surfaces 16,16a of blocks 20,20a are lapped and polished to achieve maximum flatness and cleaned. These surfaces are then sputtered with a suitable non-magnetic transducing gap forming material, for example glass alumina or silicon dioxide. The blocks 20,20a are assembled and bonded together, as it is shown in FIG. 7. Both the sputtering and bonding processes are well known in the art, and therefore, will not be described in detail.

The thusly bonded blocks 20,20a are then sliced along parallel planes 40, extending substantially perpendicularly to the gap plane 16,16a, as it is shown by interrupted lines, to obtain a plurality of magnetic transducers 32. The transducer cores 32 may be contoured (not shown), if desired, prior to or after the slicing step, at the transducer-to-medium interface portion 17a,17b to obtain a desired contour utilizing well known contouring techniques.

Figure 8:
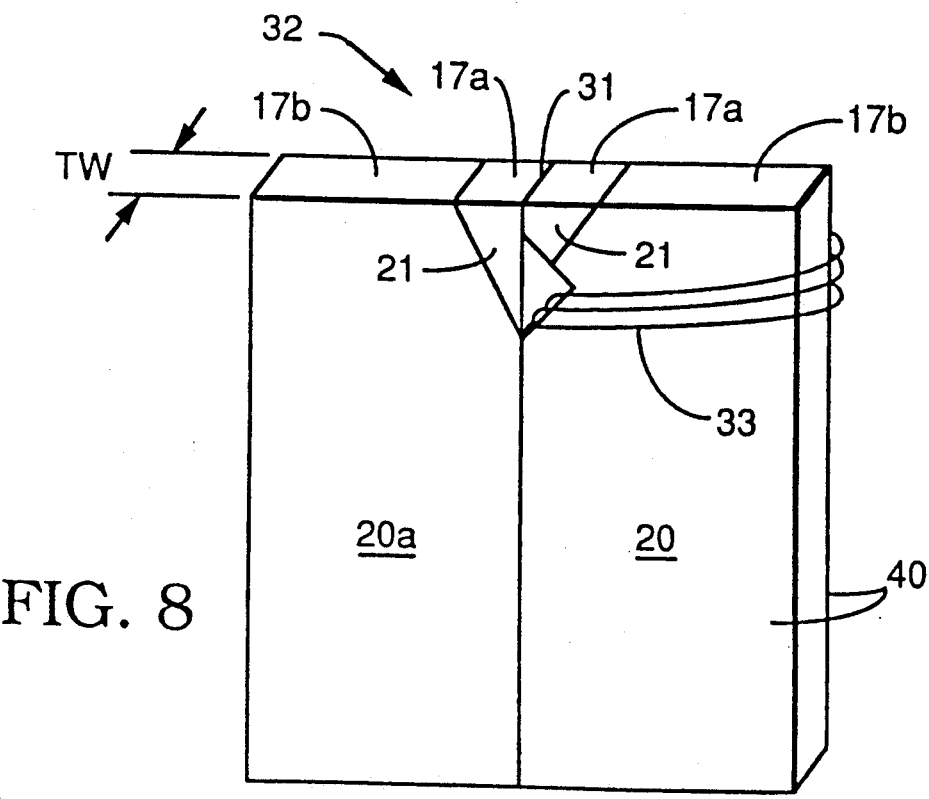
FIG. 8 is a simplified perspective view of a preferred embodiment of a composite core magnetic transducer structure of the invention, resulting from the method steps shown in FIGS. 1 to 7.

The resulting transducer structure 32 in accordance with the preferred embodiment of the invention is shown in FIG. 8. The opposite parallel surfaces 40 define a desired track width TW. Well known track width reducing method steps may be provided to further reduce the track width TW. Transducing windings 33 are wound around the core 20, while passing through the winding 30, in a known manner. It will be understood by those skilled in the art that the transducer of the invention may have other types of transducing windings provided thereon, for example they may be wound around both cores 20,20a, or provided at a different location of the transducer core, or by a different technique, for example utilizing well known thin film deposition and photolithographic techniques.

As it is seen from FIG. 8, the resulting composite core transducer 32 in accordance with the invention has its transducing gap 31 defined by the single crystal ferrite wedge portion 21, which provides sharp, well defined edges, and is not susceptible to material pullouts. Because of the relatively small amount of single crystal ferrite which is in contact with the medium, rubbing noise is reduced to an insignificant magnitude which is not objectionable. Therefore, the reduction of rubbing noise does not need to be considered among the features to be optimized by the proper crystal axis orientation. The optimization process is thereby simplified and better magnetic properties, longer wear and improved overall transducer performace are obtained. At the same time, the polycrystalline ferrite material which is more susceptible to pullouts, but does not have objectionable rubbing noise is utilized to compose a much larger portion of the transducer core, while it is provided outside the areas which are critical to gap definition.

It is noted that while the above-described method yields a plurality of composite core magnetic transducers in accordance with the invention, it may also be utilized to make one or two transducers at a time.

As an alternative to the above-described slicing step, the bonded block shown in FIG. 7 may be sliced along parallel planes 41 which extend at an oblique angle beta to the gap plane 16,16a. Thereby a plurality of individual transducers 42 is obtained, which may be utilized for azimuth recording/playback as it is well known in the art.

From the foregoing description it will become apparent that the first and second magnetic material utilized in cores 20,20a are not limited to the use of single crystal and polycrystalline ferrite, described in the preferred embodiment. Generally, as the first magnetic material utilized to form the wedge shaped core portion, any magnetic material may be utilized which has a relatively high granular density and other desirable physical and magnetic properties which are necessary to obtain excellent transducing gap definition and integrity. Analogously, as the second magnetic material any material may be utilized which has excellent magnetic and other desirable properties, but generally would provide a lesser gap integrity than that obtained by the first material. For example, as a first magnetic material a metallic magnetic material may be utilized, such as Sendust or amorphous metal.

While a preferred embodiment of the invention has been described above and illustrated in the drawings, it will be appreciated that a number of alternative embodiments and modifications may be made which will fall within the scope of the appended claims.

I claim:

1. A method of making a magnetic transducer, comprising the steps of:

providing a composite block of magnetic material, where a first portion is made of a first magnetic material, and a second portion is made of a second magnetic material, said first and second block portions being integrally joined at corresponding planar surfaces;

removing portions of said composite block around a periphery thereof at surfaces extending at oblique angles to said integrally joined surfaces to obtain a composite magnetic core having said first portion reduced to a wedge shaped portion, a first surface of said wedge shaped portion extending in a transducer-to-medium interface, a second surface extending in a transducing gap plane and substantially perpendicularly to said first surface, and a third surface corresponding to said integrally joined surfaces; and assembling and integrally joining together two corresponding composite magnetic cores with said respective second surfaces of said wedge shaped portions abutting and with a transducing gap forming material provided therebetween.

2. The method of claim 1 further comprising the step of slicing said integrally joined cores in parallel planes extending at a selected angle to said transducing gap plane.

3. The method of claim 1 wherein said first magnetic material has a higher granular density than said second magnetic material.

4. The method of claim 1 wherein the first material is a single crystal ferrite and the second material is a polycrystalline ferrite.

5. The method of claim 4 wherein the step of providing a composite block of magnetic material comprises growing said single crystal ferrite on said polycrystalline ferrite.

6. The method of claim 1 wherein the step of providing a composite block of magnetic material comprises providing a separate first and second block portion, respectively, providing corresponding planar surfaces on each said block portion, and diffusion bonding said first and second block portion at said corresponding planar surfaces.

7. The method of claim 1 wherein said first material is a magnetic metallic material.

8. The method of claim 1 wherein said step of removing comprises machining said second surface at an angle of 45 degrees or less with respect to said integrally joined surfaces.

9. The method of claim 1 further comprising the step of machining a winding window inwardly of said second surface in at least one of said composite magnetic cores prior to said assembling step.

10. A method of making a composite core magnetic transducer, comprising the steps of:

providing a first block of single crystal magnetic ferrite, and a second block of a polycrystalline magnetic ferrite, and diffusion bonding said first and second block at corresponding planar surfaces to obtain a composite block;

machining said composite block around a periphery thereof to obtain a composite magnetic core block, said machining step comprising removing a first portion of said composite block at a first planar surface extending at an oblique angle to said integrally joined surfaces, said first surface corresponding to a transducing gap plane, and removing a second portion of said composite block at a second planar surface, extending substantially perpendicularly to said first surface, said second surface corresponding to a transducer-to-medium interface, to reduce said first block to a wedge shaped portion;

assembling and integrally joining two corresponding composite magnetic core blocks with said first planar surfaces of said wedge shaped portions abutting and with a transducing gap forming material provided therebetween; and slicing and integrally joined magnetic core blocks in parallel planes extending at a selected angle to said transducing gap plane.

* * * * *